Figure 1:
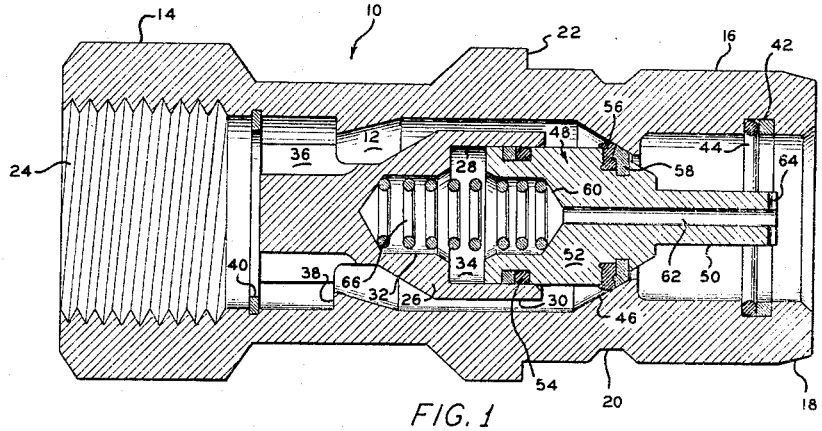

Nov. 2, 1965  G. W. GOODWIN ETAL  3,215,161
SELF-SEALING COUPLING
Filed Dec. 13, 1962  3 Sheets-Sheet 1

INVENTOR
*GORDON W. GOODWIN*
*RAYMOND E. DENNEY*

BY

*their* ATTORNEY

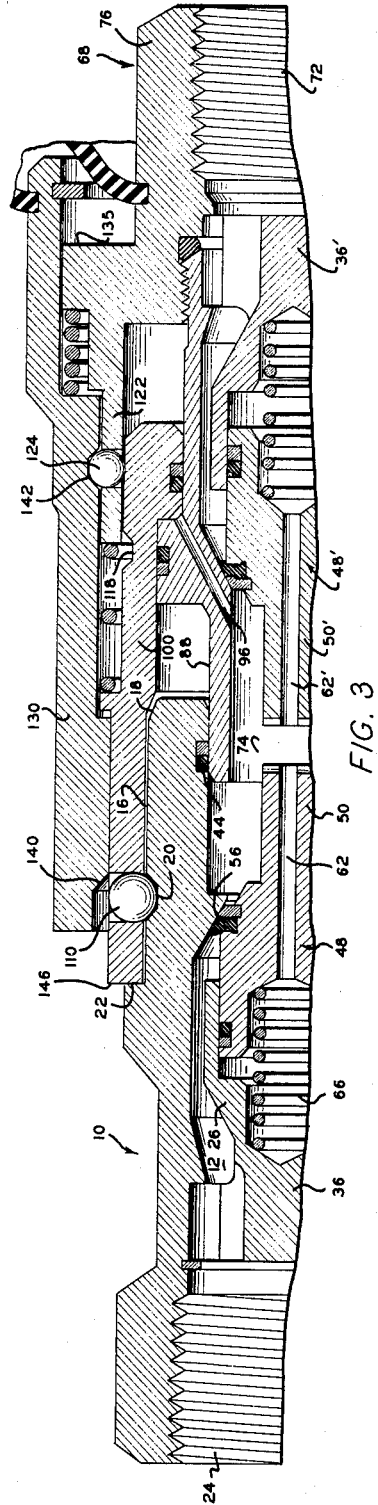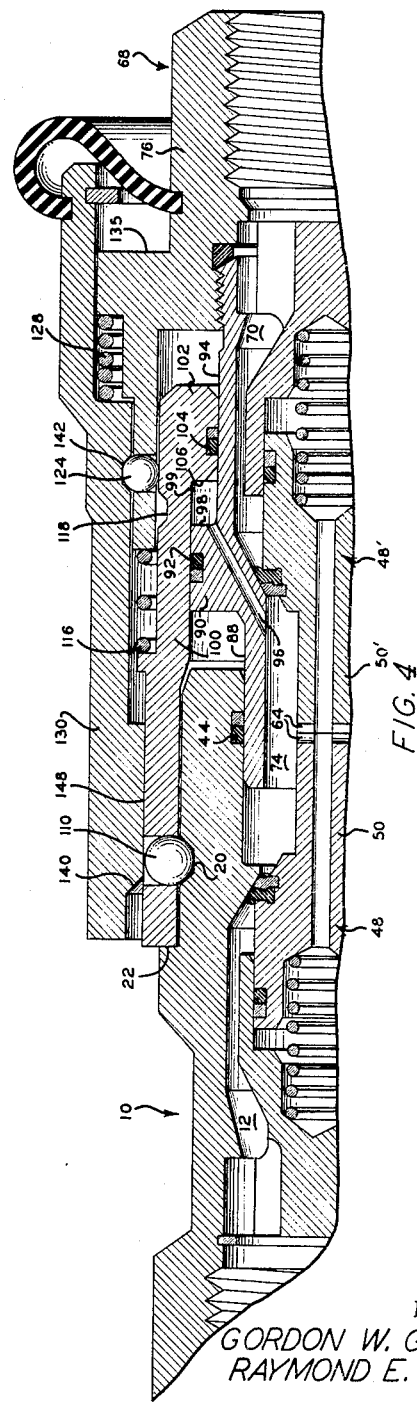

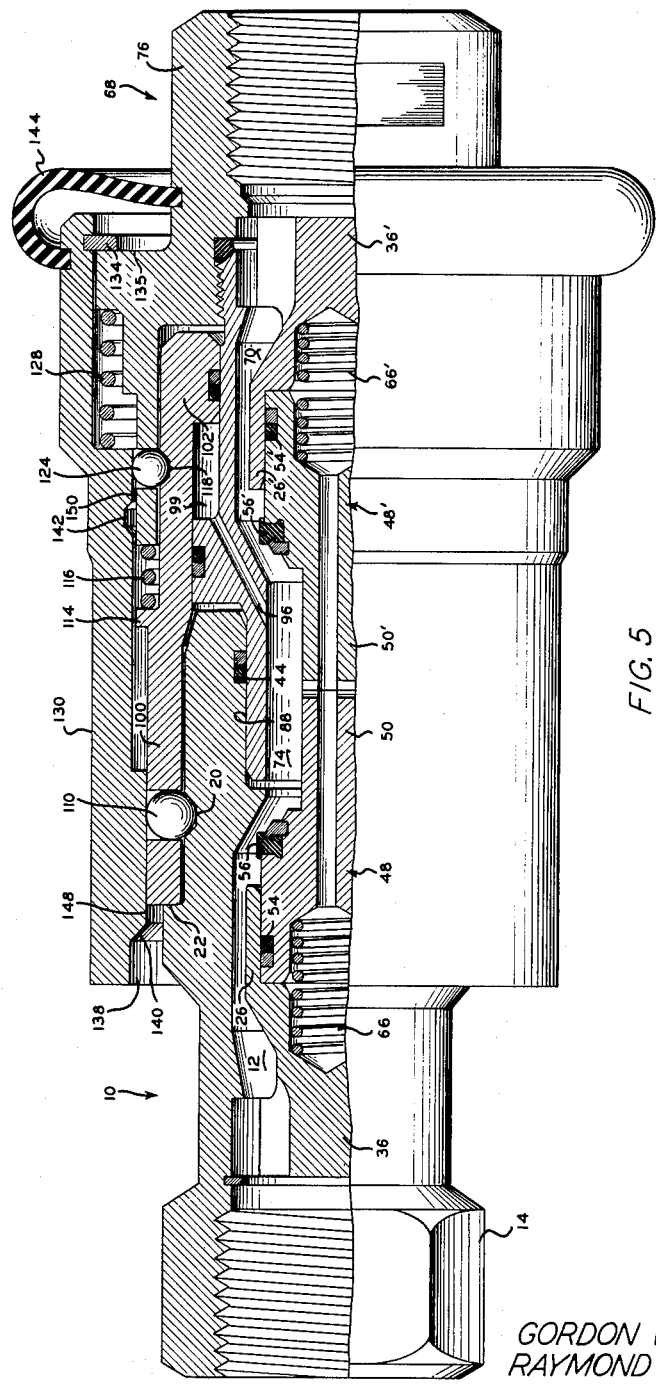

United States Patent Office 3,215,161
Patented Nov. 2, 1965

1

3,215,161
SELF-SEALING COUPLING
Gordon W. Goodwin and Raymond E. Denney, Jackson, Mich., assignors to Aeroquip Corporation, Jackson, Mich.
Filed Dec. 13, 1962, Ser. No. 244,468
6 Claims. (Cl. 137—614.04)

The invention pertains to a conduit coupling, and particularly relates to a separable coupling of the self-sealing type which may be employed in high pressure fluid systems.

Separable self-sealing couplings are commonly employed in fluid systems for quickly connecting and disconnecting the various components of the system. Such fluid systems may be employing air, gases, or liquids, and couplings of the self-sealing type employ a valve within the bore of the separable coupling halves or body members. Normally, the valves of the body members are so constructed as to mutually engage during the connection of the body members whereby the axial movement required to connect the body members unseats the valves and opens the bores of the body members to establish communication therebetween. Depending upon the type of pressurized fluid system, either one or both of the body members are of the self-sealing type to prevent the escape of the pressurized fluid from the system upon disconnection of the coupling body members. The connection and disconnection of the above described type of coupling may be readily accomplished in relatively low pressure system applications in that the forces imposed upon the coupling body members by the fluid pressure during the connection and disconnection thereof are not sufficient to adversely affect the relative movement of the body members as produced by the operator. However, self-sealing couplings of this type cannot be manually connected in high pressure fluid systems unless the pressure is first reduced within the body member bores.

The problems arising with the use of self-sealing couplings in high pressure systems result from the high axial forces imposed upon the body members during the coupling operation after the valves have been opened and before the locking apparatus of the coupling has actuated. Also, the valve in a self-sealing coupling body member usually relies upon, in part, the fluid forces within the body member bore to maintain the valve in engagement with the seat. Thus, the valve, whether of the poppet or the sleeve type, functions similar to a piston, and it is necessary for the fluid force exerted upon the valve to be overcome before the valve may be unseated during the connection of the body members. In a high pressure system, it will be apparent that the very high forces imposed upon the valves may render the manual connection of the body members most difficult, if not impossible, due to the high forces necessary to unseat the valves. Thus, both the force necessary to produce unseating of the valves and the resultant tendency of the body members to separate, after the valves are unseated, have previously prevented the manually operable self-sealing coupling from being employed in high pressure system applications.

It is a basic object of the invention to provide a self-sealing fluid coupling which may be easily manually operated regardless of the magnitude of the fluid pressure within the system employing the coupling.

Another object of the invention is to provide a self-sealing coupling employing valves within the bores of coupling body members wherein the forces imposed upon a valve by the pressurized fluid within a body member bore is substantially counterbalanced by the pressurized fluid itself.

2

Yet another object of the invention is to provide a self-sealing coupling for use in high pressure systems wherein fluid pressure actuated balancing means are employed to counteract the tendency for the fluid pressure within the coupling body members to separate the body members after the valve thereof has opened and prior to complete connection of the body members.

A further object of the invention is to provide a self-sealing coupling for use in a high pressure system wherein the sealing connection between the body members of the coupling is achieved prior to the opening of the valves thereof, and a preliminary positive connection between the body members takes place prior to the valve actuation.

Another object of the invention is to provide a self-sealing coupling for use with high pressure systems wherein a piston element is employed in conjunction with the coupling connection means operated by the fluid pressure within the coupling to assist in the connection of the coupling body members.

Yet a further object of the invention is to provide a self-sealing coupling for use in high pressure systems which is of the "breakaway" type whereby an axial force imposed upon the body members in a given direction and of a predetermined value will release the locking means maintaining the body members of the coupling in the fully connected relationship.

Figure 2:
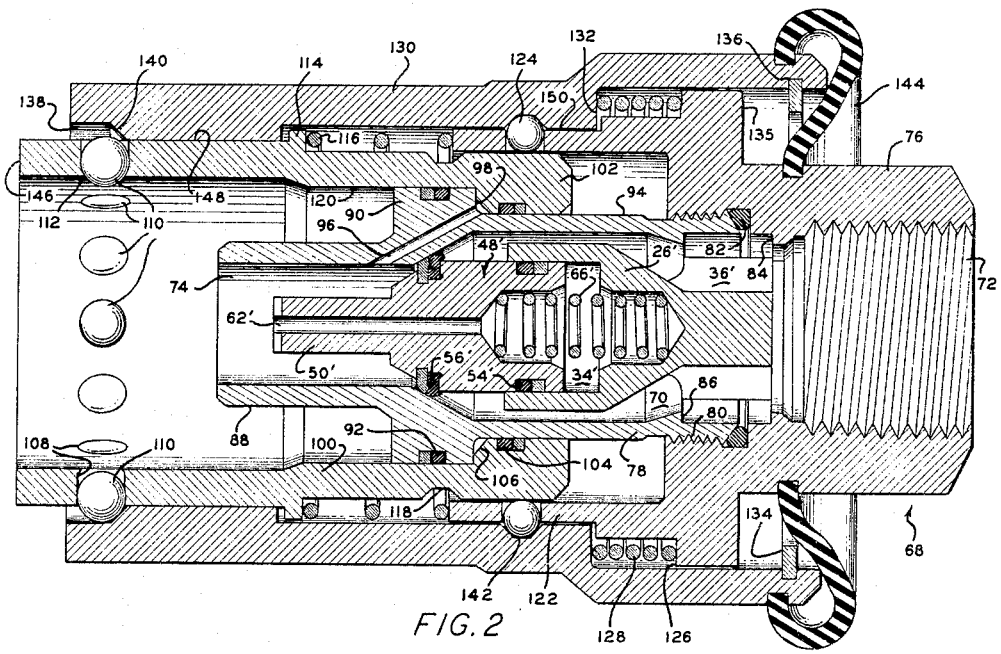

These and other objects of the invention arising from the details and relationships of components of an embodiment thereof will be apparent from the following description and accompanying drawings wherein:

FIG. 1 is a sectional, elevational view of a male body member coupling component in accord with the invention, FIG. 2 is a sectional, elevational view of a female body member coupling component in accord with the invention, FIG. 3 is a sectional, elevational, partial view of the coupling upon initial engagement of the body members, FIG. 4 is a sectional, elevational, partial view of the coupling body members during connection thereof showing the relationship of the components upon engagement of the valve elements, and FIG. 5 is an elevational, partly sectioned, view of the coupling in accord with the invention illustrating the body members in the fully connected relationship.

The construction and relationship of the components of the separate body members will be appreciated with the reference to FIGS. 1 and 2 wherein the body members are illustrated in a separated and disconnected relationship.

The male body member 10, as shown in FIG. 1, is of a generally tubular confiuration having an internal axially extending bore 12 defined therethrough. The exterior of the male body member is provided with an enlarged portion having wrench-engaging flats 14 defined thereon, and the opposite end of the exterior surface of the body member is provided with a cylindrical surface 16 which intersects the conical surface 18 at the inner end of the body member. An annular groove 20 is defined in the surface 16 and includes conical side walls, for a purpose which will be later apparent. The outer configuration of the male member 10 also includes an annular radially extending shoulder 22 which radially projects from the surface 16 and functions as an abutment during the connection of the body members.

The bore 12 is provided with threads 24 for attaching the body member to a hose end fitting, conduit, or other component of a fluid system. The opposite end of the bore constitutes an open end wherein the body member valve is accessible through this open end.

A cylinder element 26 is concentrically located within the bore 12 intermediate the threads 24 and the bore open end, and includes a cylindrical portion having an inner cylindrical surface 28 and an outer surface 30 spaced from the wall of the bore 12 to permit fluid flow through the bore. A recess 32 is defined in the cylinder element 26 communicating with the chamber 34 defined by the internal surface 28 and the valve. The cylinder element 26 is supported within the body member bore 12 by a three-legged spider portion 36 of substantial axial dimension and strength. The spider portion and the cylinder element and affixed within the bore by means of a shoulder 38 defined within the bore and a snap ring 40 cooperating with an annular groove provided in the bore.

An annular groove 42 is defined in the body member bore 12 adjacent the open end thereof for receiving an annular sealing ring 44 and its retainer. The bore 12 is also provided with an annular conical valve seat 46 with which the valve cooperates to seal the bore against fluid flow therethrough. A valve 48 is slidably supported within the bore 12 by the cylinder element 26. The valve 48 is of a generally cylindrical configuration having an axially extending nose portion 50 terminating adjacent the bore open end and an enlarged portion 52. An annular groove is defined in the valve portion 52 receiving the sealing ring 54, and its retainer, which functions as a piston due to its sealed cooperation with the cylinder surface 28. The valve portion 52 is also provided with other annular grooves axially spaced from the ring 54 for the reception of a resilient valve sealing ring 56 and a sealing ring retainer 58. The sealing ring 56 is of such configuration as to sealingly engage the valve seat 46 when the valve 48 is in the position shown in FIG. 1, and the retainer 58 is of an external conical configuration which will also engage the surface of the valve seat during the valve operation.

The valve portion 52 is provided with a spring-receiving recess 60, and an axial passageway 62 extends from the recess 60 through the nose portion 50 of the valve. The terminating end of the nose 50 is provided with a radially extending slot 64 which intersects the passageway 60. A compression spring 66 is interposed between the cylinder element 26 and the valve 48, being received within and positioned by the recesses 32 and 60. The spring 66 biases the valve 48 toward the valve seat 46, and insures that the valve will be sealingly engaging the valve seat when the body member 10 is disconnected.

As previously mentioned, an important object of the invention is to provide a coupling which may be employed in high pressure fluid systems and wherein the fluid pressure within the body member bores does not adversely affect the force required to accomplish connection and disconnection of the body members. To this end, the above described construction causes the sealing rings 54 and 56 to function as piston elements having pressure faces in communication with the pressurized fluid within the bore 12. Thus, the fluid pressure within the bore 12 will impose a force upon the sealing ring 56 in a direction tending to move the valve 48 to the right, FIG. 1, and the fluid pressure imposed upon the pressure face of the sealing ring 54 tends to move the valve to the left. The faces of the sealing rings not subjected to the fluid pressure may be designated as nonpressure faces and, in the case of the sealing ring 56, will be in engagement with the valve seat 46, and will also be in communication with the atmosphere in the open end of the bore 12. The nonpressure face of the sealing ring 54 is in communication with the cylinder chamber 34 which also is under atmospheric pressure conditions due to the provision of the passageway 62. In the manufacture of the dimensions of the sealing rings 54 and 56, the construction of the sealing rings is such that the effective pressure area of the sealing ring 54 will be substantially equal to the effective pressure face area of the sealing ring 56 whereby, since both sealing rings are mounted upon the same valve member and are disposed in opposite directions, the axial forces imposed upon the sealing rings by the fluid pressure within the bore 12 will be substantially counterbalanced. It will be appreciated that as the effective pressure faces of the sealing rings 54 and 56 are transversely disposed to the axis of the bore and the direction of valve movement during operation, that the counterbalancing effect of the valve construction will be in the axial direction of the valve parallel to the valve movement during operation between the open and closed positions. Thus, to open the valve 48, while the interior of the bore 12 is subjected to a high fluid pressure, it is necessary only to overcome the biasing effect of the spring 66 and existing friction resistance.

The female body member component of the coupling in accordance with the invention is shown in its disconnected state in FIG. 2. The female body member 68 is also of a tubular configuration and is constructed as a two-part element. The body member 68 is provided with a bore 70 having a threaded end 72 for attachment to the conduit or other pressure system component and an open end 74 axially spaced from the threaded end. The bore 70 is defined in both of the parts 76 and 78 constituting the body member. The part 78 is threadedly attached to the body member part 76 at 80, and is provided with a sealing ring 82 interposed therebetween to prevent fluid leakage at the threads.

The bore and valve construction therein, of the female body member 68, is substantially identical to that of the male body member 10 describe above with regard to FIG. 1, and similar components are indicated by like primed reference numerals. The mounting of the spider portion 36' of the cylinder element 26' may be accomplished by interposing the radially disposed edges of the spider between a shoulder 84 defined upon the body member part 76 and a shoulder 86 defined upon the body member part 78. Thus, after assembling the cylinder element 26' and valve 48' within the bore 70, threading of the part 78 into part 76 will firmly attach the cylinder element of the female body member 68. As the fluid pressure within the bore 70 will act upon the valve sealing rings 54' and 56' in the before-described manner, the valve 48' will be substantially counterbalanced by the fluid forces within the bore, and only the biasing force on the spring 66' need be overcome to open the valve during connection of the body members 10 and 68.

The inner end of the body member 68 is provided with an exterior cylindrical surface 88 of a diameter to sealingly cooperate with the sealing ring 44 of the male body member. The exterior of the body member 68 is also provided with an annular guide projection 90 having a sealing ring 92, and the body member is recessed adjacent the projection to define a cylindrical surface 94 forming a portion of a hydraulic ram or cylinder employed in conjunction with a piston element, as will be described. A passage 96, or if desired several passages may be employed, establishes communication between the open end 74 of the bore 70 and the junction where the surface 94 intersects the abutment surface 98 defined upon the annular guide projection 90.

An annular piston 100 is mounted upon the body member 68 for axial reciprocation thereto, and is in operative association with the cylindrical surface 94 wherein the cylindrical surface functions as a cylinder cooperating with the piston. The annular piston 100 includes an enlarged head 102 having an internally defined groove in which the sealing ring 104 is received. A relieved face 106 is defined upon the piston head including a radially extending portion which abuttingly engages the abutment surface 98. Thus, the effective pressure face of the piston 100, as subjected to fluid pressure transmitted through passage 96, includes the radial area of the sealing ring 104 subjected to the fluid pressure as well as the area of the face 106.

The piston 100 is of substantial axial length, as compared with the dimensions of the female body member, and extends substantially beyond the cylindrical surface 88 and the open end of the bore. The outer end of the piston includes a plurality of radially extending holes 108 containing spherical ball members 110 which function to interconnect the male and female body members during connection thereof. The holes 108 are provided with an inner lip 112 which prevents the balls from completely passing into the interior of the piston.

The outer surface of the piston includes an annular projection 114 which cooperates with a spring 116, as later described, and an annular groove 118 having conically disposed edges is also formed on the piston outer surface. The inner cylindrical surface 120 of the piston element cooperates with the outer surface of the guide projection 90 and sealingly associates with the sealing ring 92.

The body member 68 is provided with an annular thin wall portion 122 radially spaced from the cylinder surface 94. The portion 122 is provided with a plurality of radially, circumferentially spaced holes in which spherical ball members 124 are located. As will be apparent from the drawings, the inner surface of the portion 122 and the surface 94 define an annular chamber in which the piston head 102 is received. The outer configuration of the body member 68 also includes a radial abutment surface 126 for cooperation with a coil compression spring 128. Spring 116 is interposed between the end of portion 122 and projection 114 and continually urges the piston 100 to the left.

An annular locking sleeve 130 encompasses most of the body member 68, and is mounted upon the body member and piston element components so as to be axially movable thereto. Shoulder 132, defined upon the sleeve 130, engages the other end of the spring 128 and, thus, will be biased to the left, relative to the body member 68, by the spring. Movement of the sleeve to the left is limited by a snap ring 134 located within a groove 136 in the sleeve. The left end of the sleeve 130, FIG. 2, is provided with an annular recess 138 having a conical surface 140 which is axially aligned with the balls 110 in the disconnected position, as illustrated in FIG. 2. An internal annular groove 142 is also defined in the sleeve 130, having conical lateral sides wherein the groove may receive the balls 124 as illustrated.

For purposes of sealing the components of the female body member 68 from dirt, etc., a resilient boot 144 is interposed between the sleeve 130 and the body member part 76 having ends received in annular grooves defined in these components.

The sequence of coupling operation during connection and disconnection of the body members will now be described.

When it is desired to connect the body members in coupled relation to permit the transmission of fluid pressure therethrough, the body members 10 and 68 will be axially aligned so that the open ends of the bores thereof will be in opposed facing relation and the body members will be brought together by an axial movement. The initial engagement of the body members will produce the relationship shown in FIG. 3. Thus, upon insertion of the male body member inner end into the piston 100, the conical surface 18 will engage the balls 110 and radially push them outwardly wherein the balls 110 will ride over the surface 16 as the body members are brought together. Upon the groove 20 axially aligning with the balls 110, the end 146 of the piston 100 will abuttingly engage the male body member shoulder 22. At this time, the sealing ring 44 will sealingly cooperate with the cylindrical surface 88 defined upon the female body member and, thus, close the open ends of the body member bores to the atmosphere. It will be noted that at this time the ends of the valve nose portions 50 have not engaged and the valves 48 and 48' will remain closed.

The operator continues to manually move the body members 10 and 68 together, and such action will cause the piston 100 to move to the right due to the abutting engagement of the surfaces 22 and 146. As the piston 100 is moved to the right, the sleeve conical surface 140 will bias the balls 110 into the groove 20, and continued movement of the body members axially aligns the balls 110 with the cylindrical sleeve backup or ball-retaining surface 148, which maintains the balls within the groove 20 and provides a positive interconnection between the piston 100 and the male body member 10. FIG. 4 illustrates the coupling component relationships upon engagement of the nose portions of the valves 48 and 48' and prior to unseating of the valves. It will be noted that at this time the balls are securely maintained in the groove 20 by the surface 148.

Further relative axial movement of the body members 10 and 68 from the position shown in FIG. 4, moves the valve seats 46 and 46' toward each other, while the valves remain stationary. Thus, the valves unseat and fluid will flow past the sealing rings 56 and 56' into the opening bore ends of the associated body members. Fluid communication between the body members 10 and 68 has now been established. As the passage 96 is now subjected to the fluid pressure of the system, high pressurized fluid will be introduced into the chamber 99 defined by the surface 94, projection 90, portion 122, and the piston head 102. The introduction of the pressurized fluid into the chamber 99 imposes fluid pressure forces upon the effective pressure face of the piston 100 and tends to move the piston to the right with respect to the drawings.

It will be appreciated that in conventional self-sealing coupling constructions, the opening of the body member valves and the attendant introduction of fluid pressure into the spaces between the body members imposes axially directed forces upon the body members tending to separate them. In low pressure applications, the forces tending to separate the body members, prior to actuation of the coupling locking structure, can be easily overcome by the operator and this fluid force causes no serious problem. However, in high pressure applications, the very great axially directed forces imposed upon the body members as soon as the valves open would cause the body members to be violently separated if means to prevent such an occurrence were not employed.

The coupling of the invention produces a positive connection between the coupling body members prior to opening of the valves due to the engagement of the piston with the male body member by the balls 110 and groove 20. As soon as the valves 48 and 48' open, the fluid forces within the body member bores, tending to separate the body members, will also be imposed upon the effective pressure face of the piston head 102 and, thus, the fluid forces tending to separate the body members will be counteracted by the axial force produced by the fluid upon the pressure face of the piston head. In designing the area of the effective pressure faces of the piston 100, it is desired that the axial force to the right, imposed upon the piston by the fluid, be substantially equal to the forces tending to separate the body members whereby the piston provides a counterbalancing effect permitting the connection of the body members to be manually accomplished regardless of the magnitude of the fluid pressure within the fluid system.

After the valves 48 and 48' have opened, the operator continues to push the body members together. The relative axial movement of the body members increases the volume of the cylinder chamber as the piston 100 moves to the right. However, the fluid flow into the chamber through the passage 96 is sufficient to maintain the system fluid pressure within the chamber and, thus, maintain the counterbalancing effect throughout the connecting operation.

Locking of the body members together occurs upon axial alignment of the groove 118 with the balls 124. Upon such occurrence, the biasing force imposed upon the sleeve 130 by spring 128 will cause the right conical surface of the groove 142 to force the balls 124 into the groove 118, and axially align the sleeve backup or locking surface 150 with the balls 124 to maintain a positive connection between the balls and the piston 100. Movement of the sleeve 130 to the left is limited by engagement of the sleeve 130 with the shoulder 135 formed on the body member part 76, as shown in FIG. 5. The fully connected relationship of the coupling is shown in FIG. 5 wherein the valves are fully opened, and unrestricted passage of the fluid between the body member bores occurs. It will be appreciated that the counterbalancing effect produced by the piston 100 will be operative at all times after the valves 48 and 48' are opened and fluid pressure is within the system.

Disconnection of the body members 10 and 68 may be accomplished manually or by a "breakaway" operation. In the manual operation, the operator will grasp the sleeve 130 and move the sleeve to the right, FIG. 5, relative to the body members 10 and 68 until the groove 142 is an axial alignment with the balls 124. Alignment of the groove 142 and balls 124 permits the right conical side of groove 118 to force the balls into groove 142 releasing the locking relationship between the body members, and permits the body members to be pulled apart. The sequence of operation of the body members components during disconnection is the reverse of the operation described during connection. Thus, the piston 100 counterbalances the fluid forces imposed upon the body members during disconnection, and permits the operator to control the rate of disconnection.

The coupling of the invention may also be disconnected in a "breakway" manner such as that desired in agricultural applications, and the like, wherein a predetermined axial pull on the male body member causes the body members to separate without damaging the fluid system or the components thereof. If the coupling is to be disconnected by the "breakaway" operation, the sleeve 130 will be mounted in a support and the male body member 100 will be associated with the portion of the fluid system which will produce the axial pull on the coupling. An axial pull on the male body member to the left, FIG. 5, while the sleeve is fixed, compresses the spring 128 in that this axial force will cause both the male and the female body members to move to the left with respect to the sleeve. Continued body member movement to the left continues until the balls 124 align with the groove 142. Thereupon, the right conical surface of the groove 118 will cause the balls to be radially shifted outwardly into the groove 142 and, thus, release the locking connection between the body member 68 and the piston 100. Further movement of the male body member to the left begins to separate the body members and, upon the balls 110 aligning with the recess 138, the balls will be radially translated outwardly by the right conical surface of the groove 20 and the male body member will be fully released from the piston 100. As will be apparent from the description concerning the connection of the body members, the sealing relationship between sealing ring 44 and surface 88 will be maintained after the valves 48 and 48' have closed and, thus, only a very small amount of fluid will be lost during disconnection.

Therefore, it will be appreciated that the invention provides a unique coupling construction for use with high pressure systems wherein connection and disconnection of the coupling body members may be readily accomplished manually while the body members are internally subjected to high pressures. As both the body member valves and the forces imposed upon the body members after the valves have opened are counterbalanced by the fluid pressure itself, the coupling operation is not affected by the magnitude of the fluid pressures within the body members, and only the forces imposed by the springs and frictional forces need be overcome during the connection and disconnection of the coupling. If desired, the effective pressure face area of the valve sealing rings 56 may be made slightly larger than the effective pressure area of the sealing rings 54 whereby the fluid pressure may be used to aid in maintaining the valves closed. In a like manner, the effective pressure face area of the piston head 102 may be slightly greater than the area subjected to the fluid pressures within the body members, after the valves have opened, wherein the piston 100 actually aids in coupling the body members. However, such a use of differential pressure face areas to slightly offset a true counterbalanced condition requires that the forces imposed by the fluid pressure be overcome either during the connection or the interconnection operations and, thus, in most applications the desired effective pressure face areas of the counterbalancing means will be substantially equal whereby a substantially equalized counter-balancing effect is produced.

It will be appreciated that a number of modifications to the invention may be apparent to those skilled in the art without departing from the spirit and scope thereof, and it is intended that the invention be defined only by the scope of the following claims.

What is claimed is:
1. A self-sealing coupling characterized by its ability to be coupled and uncoupled while subjected to high internal pressures comprising, in combination,
   (a) a pair of interconnectable body members each having a bore defined therein having an open end,
   (b) a valve within each of said bores controlling fluid flow therethrough, said valves engaging and opening during interconnection of said body members,
   (c) preliminary connecting means interconnecting said body members prior to opening of said valves,
   (d) sealing means establishing a sealing relationship between said body members prior to opening of said valves,
   (e) fluid pressure balancing means defined upon at least one of said body members substantially balancing the fluid pressure forces imposed on said body members in a direction parallel to the direction of relative body member movement during connection and disconnection, and
   (f) locking means locking said body members together upon complete interconnection thereof.
2. In a self-sealing coupling as in claim 1, wherein,
   (a) said fluid pressure balancing means includes a piston and cylinder device mounted upon one of said body members,
   (b) means establishing communication between said device and the pressurized fluid medium upon opening of one of said valves,
   (c) said device being operatively connected to said preliminary connection means.
3. A self-sealing coupling characterized by its ability to be coupled and uncoupled while subjected to high internal pressures comprising, in combination,
   (a) first and second connectable coupling body members each having a bore defined therein having an open end,
   (b) cooperating sealing means defined on said body members establishing a sealed connection between said bores at the initial stages of connection of said body members,
   (c) an axially movable valve within the bore of each of said body members adapted to close the associated bore against fluid flow therethrough upon said body members being disconnected, said valves engaging and opening during connection of said body members and after establishment of said sealed connection,
   (d) an annular cylinder defined in said second body member,
   (e) an annular piston mounted on said second body member for axial movement thereto operatively associated with said cylinder,
   (f) piston-mounted connection means carried by said piston,
   (g) connection means defined on said first body mem- ber cooperating with said piston-mounted connection means during interconnection of said body members,
(h) passage means defined in said second body member establishing communication between the bore of said second body member intermediate the open end thereof and the associated valve and said annular cylinder,
(i) said piston having a pressure face area sufficient to create an axial force on said piston in the direction of relative body member movement during connection of said body members which substantially counterbalances the fluid pressure tending to separate said body members upon opening of said valves, and
(j) locking means releasably securing said body members together after complete interconnection thereof.

4. A self-sealing coupling characterized by its ability to be coupled and uncoupled while subjected to high internal pressures comprising, in combination,
(a) a pair of interconnectable body members each having a bore defined therein having an open end,
(b) a valve within each of said bores controlling fluid flow therethrough, said valves engaging and opening during interconnection of said body members,
(c) fluid pressure actuated valve balancing means associated with each of said valves substantially balancing the fluid pressure imposed thereon by the fluid within the bores tending to close said valves,
(d) connecting means and sealing means interconnecting said body members prior to opening of said valves,
(e) fluid pressure balancing means defined upon said body members substantially balancing the fluid pressure forces imposed on said body members in a direction parallel to the direction of relative body member movement during connection and disconnection, and
(f) locking means defined upon said body members locking said body members together upon complete interconnection thereof.

5. In a self-sealing coupling as in claim 4, wherein,
(a) said valve balancing means includes a pair of piston elements having pressure faces disposed in opposite directions parallel to the direction of valve movement during actuation thereof, and
(b) a nonpressure face defined upon each of said piston elements oppositely related to the associated pressure face and communicating with the atmosphere upon said body members being disconnected.

6. In a self-sealing coupling as in claim 4, wherein,
(a) said fluid pressure balancing means defined upon said body members includes a cylinder defined upon one of said body members,
(b) a piston associated with said cylinder movable therein in a direction parallel to the direction of relative body member movement during connection and disconnection, said piston constituting a portion of said connecting means.

References Cited by the Examiner
UNITED STATES PATENTS

| | | | |
|---|---|---|---|
| 214,334 | 4/79 | Westinghouse | 137—614.04 XR |
| 2,665,928 | 1/54 | Omon | 137—614.04 XR |
| 3,097,867 | 7/63 | Saloum | 137—614.03 XR |

WILLIAM F. O'DEA, *Primary Examiner.*